(12) United States Patent
Volach

(10) Patent No.: US 10,880,156 B2
(45) Date of Patent: Dec. 29, 2020

(54) E-MAIL STATUS NOTIFICATION SYSTEM AND METHOD

(71) Applicant: Pecan Technologies Inc, Road Town (VG)

(72) Inventor: Ben Volach, London (GB)

(73) Assignee: Pecan Technologies Inc, Road Town (VG)

( * ) Notice: Subject to any disclaimer, the term of this patent is extended or adjusted under 35 U.S.C. 154(b) by 0 days.

(21) Appl. No.: 15/894,003

(22) Filed: Feb. 12, 2018

(65) Prior Publication Data

US 2018/0167265 A1 Jun. 14, 2018

Related U.S. Application Data

(63) Continuation-in-part of application No. 14/900,175, filed as application No. PCT/IB2014/062616 on Jun. 26, 2014, now abandoned.

(60) Provisional application No. 61/839,398, filed on Jun. 26, 2013.

(51) Int. Cl.
*H04L 29/08* (2006.01)
*H04L 12/58* (2006.01)
*H04L 12/24* (2006.01)

(52) U.S. Cl.
CPC .......... *H04L 41/0686* (2013.01); *H04L 29/08* (2013.01); *H04L 51/22* (2013.01); *H04L 51/24* (2013.01); *H04L 67/2842* (2013.01)

(58) Field of Classification Search
CPC ....... H04L 51/00; H04L 51/12; H04L 51/066; H04L 69/08; H04L 51/063; H04L 51/08; H04L 63/101; H04L 29/06; H04L 51/34; H04L 63/0428; H04L 63/0435; H04L 63/14; H04L 63/20; H04L 69/329; H04L 9/0861; H04L 51/24; H04L 29/06034; H04L 29/0809; H04L 51/02; H04L 63/1408; H04L 63/145; H04L 63/1491;
(Continued)

(56) References Cited

U.S. PATENT DOCUMENTS 5,956,486 A * 9/1999 Hickman ............. G06Q 10/107
340/10.6
7,734,909 B1 * 6/2010 Roush ................. H04L 63/0227
709/203

(Continued)

OTHER PUBLICATIONS

International Search Report PCT/IB2014/062616 Completed Mar. 4, 2015; dated Mar. 16, 2015 2 pages.
(Continued)

*Primary Examiner* — Djenane M Bayard

(57) ABSTRACT

A system for alerting e-mail activity status. The system has at least one e-mail server for integrating N e-mail accounts, at least one second server communicating with the e-mail server adapted to monitor at the e-mail server; at least one computer readable medium (CRM) adapted to receiving an e-mail alert wherein the second server identifies activity status in the e-mail server according to a set of predetermined parameters. The second server alerts the CRM on the activity status. The parameters may consist of entries to e-mail accounts type of actions performed in an e-mail account and other activities and events. The invention further comprises methods of applying the aforementioned system.

10 Claims, 10 Drawing Sheets

(58) Field of Classification Search
CPC ......... H04L 51/10; H04L 51/14; H04L 51/22; H04L 51/32; H04L 63/1416; H04L 63/1483; H04L 29/12216; H04L 29/12594; H04L 43/00; H04L 51/30; H04L 51/36; H04L 51/38; H04L 61/2007; H04L 61/30; H04L 63/0227; H04L 63/0823; H04L 63/123; H04L 67/04; H04L 67/125; H04L 12/2854; H04L 51/046; H04L 51/16; H04L 51/18; H04L 51/28; H04L 63/04; H04L 63/102; H04L 63/1425; H04L 63/1433; H04L 67/18; H04L 67/24; H04L 51/04; H04L 51/043; H04L 67/306; H04L 67/36; H04L 65/403; H04L 12/183; H04L 63/0245; H04L 63/0807; H04L 63/10; H04L 63/18; H04L 67/12; H04L 67/26; H04L 67/34; H04L 12/66; H04L 51/26; H04L 63/1441; H04L 67/303; H04L 12/1822; H04L 29/06027; H04L 29/1218; H04L 29/12207; H04L 43/0817; H04L 61/1511; H04L 61/1564; H04L 61/20; H04L 61/302; H04L 61/307; H04L 63/0236; H04L 63/126; H04L 65/4084; H04L 67/10; H04L 67/16
See application file for complete search history.

(56) References Cited

U.S. PATENT DOCUMENTS

| | | | |
|---|---|---|---|
| 8,301,712 B1 | 10/2012 | Lu et al. | |
| 8,468,205 B2* | 6/2013 | Westen | H04L 51/043 709/206 |
| 2002/0120699 A1 | 8/2002 | Wakabayashi | |
| 2003/0014491 A1* | 1/2003 | Horvitz | G06Q 10/109 709/206 |
| 2004/0177118 A1 | 9/2004 | Mason et al. | |
| 2004/0199663 A1* | 10/2004 | Horvitz | G05B 19/404 709/238 |
| 2004/0243941 A1* | 12/2004 | Fish | G06Q 10/107 715/752 |
| 2005/0021485 A1* | 1/2005 | Nodelman | G06Q 10/109 706/21 |
| 2005/0188046 A1* | 8/2005 | Hickman | G06Q 10/107 709/206 |
| 2007/0005762 A1* | 1/2007 | Knox | G06Q 10/107 709/224 |
| 2008/0040441 A1 | 2/2008 | Maes | |
| 2009/0077244 A1* | 3/2009 | Trang | H04M 3/42195 709/228 |
| 2010/0257453 A1* | 10/2010 | Jachner | H04L 67/24 715/738 |
| 2011/0067102 A1* | 3/2011 | Fukasawa | G06Q 10/107 726/22 |
| 2012/0072590 A1 | 3/2012 | Holt et al. | |
| 2013/0097254 A1 | 4/2013 | Appelman et al. | |
| 2015/0288627 A1 | 10/2015 | Rowe et al. | |

OTHER PUBLICATIONS

Written Opinion of the International Searching Authority PCT/IB2014/062616 dated Mar. 16, 2015 7 pages.
International Preliminary Report on Patentability PCT/IB2014/062616 43 pages.

* cited by examiner

E-MAIL STATUS NOTIFICATION SYSTEM AND METHOD

CROSS-REFERENCE TO RELATED APPLICATIONS

This application is a continuation-in-part application of U.S. patent application Ser. No. 14/900,175 filed on Dec. 21, 2015, which claims priority of from PCT application PCT/IB14/62616 filed on Jun. 26, 2014 and provisional patent application 61/839,398 filed on Jun. 26, 2013. The contents of these applications are hereby incorporated by reference into this application in their entirety.

FIELD OF THE INVENTION

The present invention relates to the field of transferring electronic data between electronic devices, more specifically, it relates to the field of transferring data relating to a presence status of a user.

BACKGROUND

Traditionally, instant messaging services provide the availability (presence status) of a user, informing his friends whether the user is available for communication, whether he is online or whether he is busy, various presence statuses are available to enhance user experience.

However, for E-mail services, there was little change in the last decade, and the presence information related to this service, if available, is based on the user's instant messaging account and its related status.

For example, U.S. 20080244026 patent application "Real-Time Notification of Presence Changes" discloses notifying a user from a group of users on the presence status of another user from the same group. However, the application does not disclose notification of an e-mail status, it notifies only on the presence status for communication. There is therefore a long unmet need for a system that will notify users on the presence status of an e-mail account or user using an intelligent rule engine.

SUMMARY OF THE INVENTION

It is hence one object of the invention to disclose a system for alerting on an e-mail activity status. The system comprises: (a) at least one e-mail apparatus preprogrammed for executing a first set of instructions thereon for integrating N e-mail accounts; said N is an integer larger than zero; (b) at least one second apparatus being in communication with said e-mail apparatus; said at least one second apparatus adapted to monitor at least one of said e-mail apparatus; (c) at least one memory unit adapted for receiving an e-mail alert.

It is a core purpose of the invention to provide at least one second apparatus identifying activity status in at least one of said e-mail apparatus according to a set of predetermined parameters; further wherein said at least one second apparatus alerts said memory unit on said activity status.

Another object of the invention is to disclose a method for alerting on an e-mail activity status. The method comprises steps of: (a) connecting an e-mail apparatus integrating N e-mail accounts via a monitor apparatus; said N is an integer larger than zero; (b) monitoring activity of a first e-mail account selected from said N e-mail accounts by means of said monitor apparatus; (c) providing a memory adapted to receive an e-mail alert from at least one of said N e-mail accounts.

It is another core purpose of the invention to provide the method additionally comprises steps of: (a) determining activity status of said e-mail apparatus according to a set of predetermined parameters; and (b) alerting said memory on said activity status.

A further object of the invention is to disclose a system for alerting an e-mail activity status. The system comprises: (a) a first memory unit having a first set instructions thereon for: (i) executing a plurality of N actions; and (ii) retrieving information associated with at least one e-mail account; said N is an integer larger than zero; (b) at least one apparatus in communication with said first memory; said at least one apparatus is adapted to monitor performance of at least one first action selected from said N actions; (c) a second memory unit having a second set instructions thereon for receiving notification associated with said first action.

It is a further core purpose of the invention to provide at least one apparatus determines activity status of said e-mail account according to a set of predetermined parameters; said predetermined parameters are in association with said performance of said at least one first action; further wherein said at least one apparatus alerts said second memory unit on said e-mail activity status.

A further object of the invention is to disclose a method for alerting an e-mail activity status. The method comprises steps of (a) communicating by a monitor apparatus, to a first memory unit operating N actions; one of said actions is retrieving information associated with at least one e-mail account; said N is an integer larger than zero; (b) monitoring performance of at least one first action selected from said N actions; (c) communicating monitored performance of said first action to second memory unit.

It is a further core purpose of the invention to provide the method additionally comprising steps of (a) determining activity status of said e-mail account according to a set of predetermined parameters by said monitor apparatus; (b) alerting said SCRM on said e-mail activity status by said monitor apparatus.

A further object of the invention is to disclose a system for alerting an e-mail activity status. The system comprises: (a) a first memory unit having a first set of instructions thereon for: (i) executing a plurality of N actions; and (ii) retrieving information associated with at least one e-mail account; said first memory unit having at least one identification parameter; said N is an integer larger than zero; (b) at least one first apparatus in communication with said first memory unit; said at least one first apparatus receives notification of: (i) at least one first action selected from said N actions; and (ii) said at least one identification parameter; (c) at least one second apparatus in communication with said first apparatus; said at least one second apparatus adapted to monitor performance of at least one of said first action; (d) a second memory unit having a second set of instructions thereon for communicating with said first action; wherein said at least one second apparatus determines activity status of said e-mail account according to (a) a set of predetermined parameters; and (b) said at least one identification parameter; said predetermined parameters are in association with said performance of said at least one first action; said at least one apparatus alerts said memory unit on said activity status.

BRIEF DESCRIPTION OF THE DRAWINGS

In order to understand the invention and to see how it may be implemented in practice, a few preferred embodiments will now be described, by way of non-limiting example only, with reference to be accompanying drawings, in which.

DETAILED DESCRIPTION OF THE INVENTION

Figure 1:
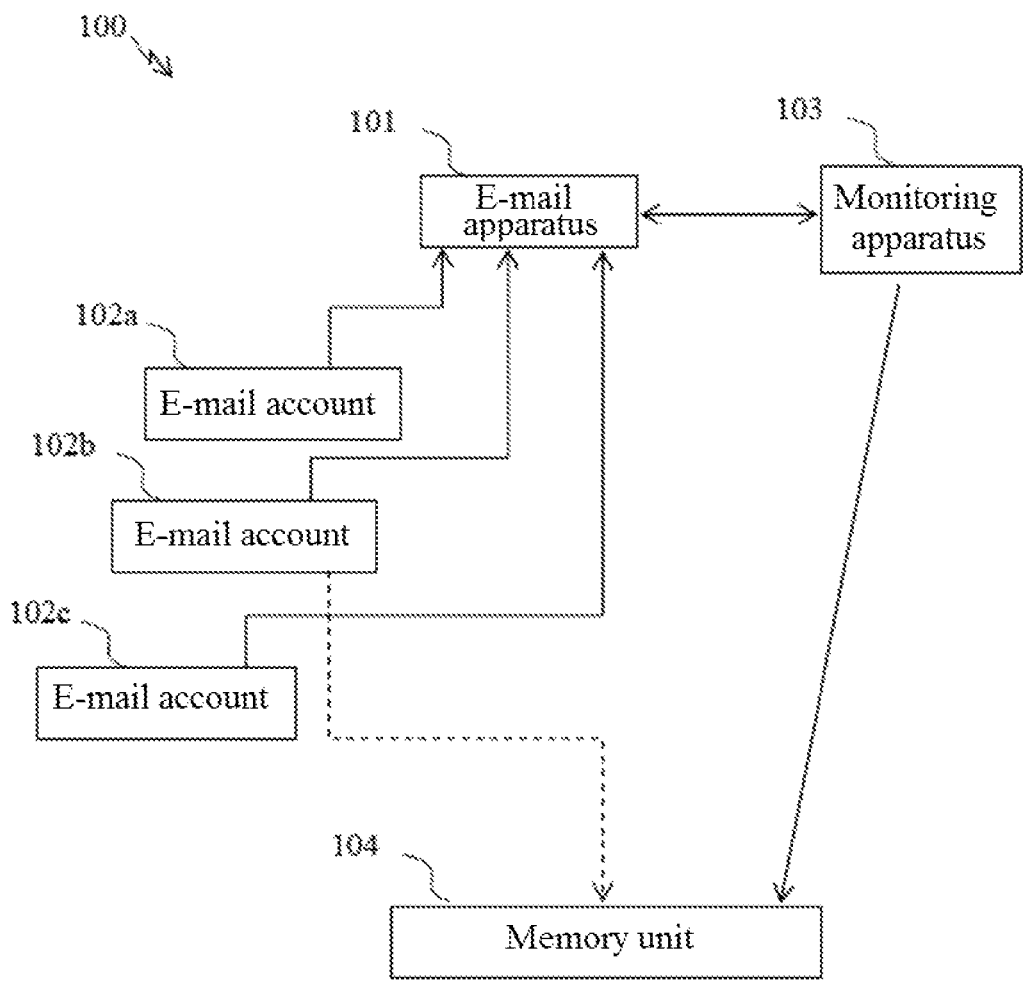
FIG. 1 illustrates in a non-limiting manner a system for notifying on an e-mail presence status via an e-mail apparatus.

The following description is provided so as to enable any person skilled in the art to make use of the invention and sets forth examples contemplated by the inventor of carrying out this invention. Various modifications, however, will remain apparent to those skilled in the art, since the generic principles of the present invention have been defined specifically. Also, it is to be understood that the phraseology and terminology employed herein is for the purpose of description and should not be regarded as limiting. It is one object of the current invention to disclose a first system for alerting an e-mail activity status comprising: a. at least one e-mail apparatus having first instructions thereon for integrating N e-mail accounts; N is an integer larger than zero; b. at least one second apparatus in communication with the e-mail apparatus; at least one second apparatus is adapted to monitor at least one of the e-mail apparatus; c. at least one memory unit in communication with at least one of the N e-mail accounts; wherein at least one second apparatus identifies activity status in at least one of the e-mail apparatus according to a set of predetermined parameters; further wherein at least one second apparatus alerts the CRM on the activity status.

It is one object of the current invention to disclose a first method for alerting on an e-mail activity status comprising steps of; a. connecting via a monitor apparatus, to an e-mail apparatus integrating N accounts; N is an integer larger than zero; b. monitoring via said monitor apparatus, activity of a first e-mail account selected from the N e-mail accounts; c. providing a memory unit communicating with at least one of the N e-mail accounts; wherein the method additionally comprising steps of: d. determining activity status of the e-mail apparatus according to a set of predetermined parameters; and e. alerting the memory unit on the activity status.

It is one object of the current invention to disclose a second system for alerting on an e-mail activity status comprising: a. at least one e-mail client having first instructions thereon for integrating N e-mail accounts; N is an integer larger than zero; b. at least one apparatus in communication with the e-mail client; at least one apparatus is adapted to monitor at least one of the e-mail client; c. at least one memory unit in communication with at least one of the N e-mail accounts; wherein at least one apparatus identifies activity status in at least one of e-mail client according to a set of predetermined parameters; further wherein at least one apparatus alerts the memory unit on the activity status.

It is one object of the current invention to disclose a second method for alerting on an e-mail activity status comprising steps of: a. connecting via a monitor apparatus, to an e-mail client integrating N e-mail accounts; N is an integer larger than zero; b. monitoring via the monitor apparatus, the activity of a first e-mail account selected from the N e-mail accounts; c. providing a computer readable medium (CRM) communicating with one of the N e-mail accounts; wherein said method additionally comprising steps of: d. determining activity status of the e-mail client according to a set of predetermined parameters; and alerting the CRM on the activity status.

It is one object of the current invention to disclose a third system for alerting an e-mail activity status comprising: a. a first memory unit having first instructions thereon for (i) executing a plurality of N actions; and (ii) retrieving information associated at least one e-mail account; N is an integer larger than zero; b. at least one apparatus in communication with the first memory unit; at least one apparatus is adapted to monitor performance of at least one first action selected from the N actions; c. a second memory unit having second instructions thereon for communicating with the first action; wherein at least one apparatus determines activity status of the e-mail account according to a set of predetermined parameters; the predetermined parameters are in association with the performance of at least one first action; further wherein said at least one apparatus alerts the second memory unit on the e-mail activity status.

It is one object of the current invention to disclose a third method for alerting an e-mail activity status comprising: a. communicating by a monitor apparatus, to a first memory unit operating N actions; one of the actions is retrieving information associated with at least one e-mail account; said N is an integer larger than zero; b. monitoring by the monitor apparatus, performance of at least one first action selected from the N actions; c. communicating between a second memory unit and the e-mail account; wherein the method additionally comprising steps of: d. determining by the monitor apparatus activity status of the e-mail account according to a set of predetermined parameters; e. alerting the second memory unit on the e-mail activity is by the monitor apparatus.

It is one object of the current invention to disclose a fourth system for alerting an e-mail activity status comprising: a. a first memory unit having first instructions thereon for (i) executing a plurality of N actions; and (ii) retrieving information associated at least one e-mail account; the first memory unit is having at least one identification parameter; N is an integer larger than zero; b. at least one first apparatus in communication with the first memory unit; at least one first apparatus receives notification of (i) at least one first action selected from the N actions; and (ii) at least one identification parameter; c. at least one second apparatus in communication with the first apparatus; at least one second apparatus is adapted to monitor performance of at least one of the first action; d. a second memory unit having second instructions thereon for communicating with the first action; wherein at least one second apparatus determines activity status of the e-mail account according to (i) a set of predetermined parameters; and (ii) at least one identification parameter; the predetermined parameters are in association with the performance of at least one first action; further wherein at least one apparatus alerts the second memory unit on the activity status.

It is one object of the current invention to disclose a fourth method for alerting an e-mail activity status comprising: a. communicating between (i) at least one software operating on a first memory unit associated with at least one e-mail account; and (ii) the software server; b. receiving by the software server: (i) notification on activity software; and (ii) identification of the memory unit; c. communicating between (i) a monitor apparatus; and (ii) the software server; d. monitoring by the monitor memory unit, performance of the software; e. communicating between a second memory unit and the e-mail account; wherein the method additionally comprising steps of: f. determining by the monitor apparatus activity status of the e-mail account according to a set of predetermined parameters; the parameters are in association with the performance of said software g. alerting the second memory unit on the e-mail activity status by the monitor memory unit.

The term "e-mail presence status" refers hereinafter to any indicator which conveys ability and willingness status of a potential communication partner. This ability or willingness may be described as indicating whether the communication partner is "online/active" or any other status providing information on his availability. For example: "sent e-mail 5 minutes ago" "offline since 10 minutes ago", "active on Facebook", "reads messages", "online with no actions taken in e-mail" etc.

The term "application", refers hereinafter to any software program adapted to be installed on a computer readable medium (for example: a smartphone).

The abbreviation "GUI" refers hereinafter to GRAPHICAL USER INTERFACE.

The abbreviation "MUA" refers hereinafter to MAIL USER AGENT.

The abbreviation "WUA" refers hereinafter to Watcher User Agent

The abbreviation "SMTP" refers hereinafter to SIMPLE MAIL TRANSFER PROTOCOL.

The abbreviation "IMPP" refers hereinafter to INSTANT MESSAGING AND PRESENCE PROTOCOL.

The abbreviation "MVP" refers hereinafter to EXTENSIBLE MESSAGING AND PRESENCE PROTOCOL.

The abbreviation "API" refers hereinafter to APPLICATION PROGRAMMING INTERFACE.

Reference is now made to FIG. 1 illustrating in a non-limiting the first system 100 for alerting on an e-mail activity status. The first system 100 comprises an e-mail apparatus 101. The e-mail apparatus integrates a plurality of e-mail accounts 102a-c. At least one of these e-mail accounts, for example, account 102b, is in communication with a memory 104. There is a monitoring apparatus 103 connected to both the e-mail apparatus 101 and the memory unit 104. The aforesaid memory unit 104 communicates with the e-mail account 102b. The purpose of the current invention is to notify the memory unit 104 on the e-mail presence status of the e-mail account 102 user. The memory unit 104 receives this e-mail presence status notification via the monitor server 103 which is adapted to scan the e-mail server 101 and decide on the e-mail presence status according to predetermined parameters regarding activity within the e-mail account 102b. Predetermined parameters might include among others any action performed on the e-mail account (e.g. login, logout, account activation, password change) or on one or more of the e-mails within the account (e.g. read, delete, mark as unread, forward, scroll up or down, mouse move, reply, share, move folder, label, open attachment, click on a link or any interaction or manipulation with any instance of said e-mail, any interaction or manipulation of any subset or derivative of said e-mails and a combination thereof).

Figure 2:
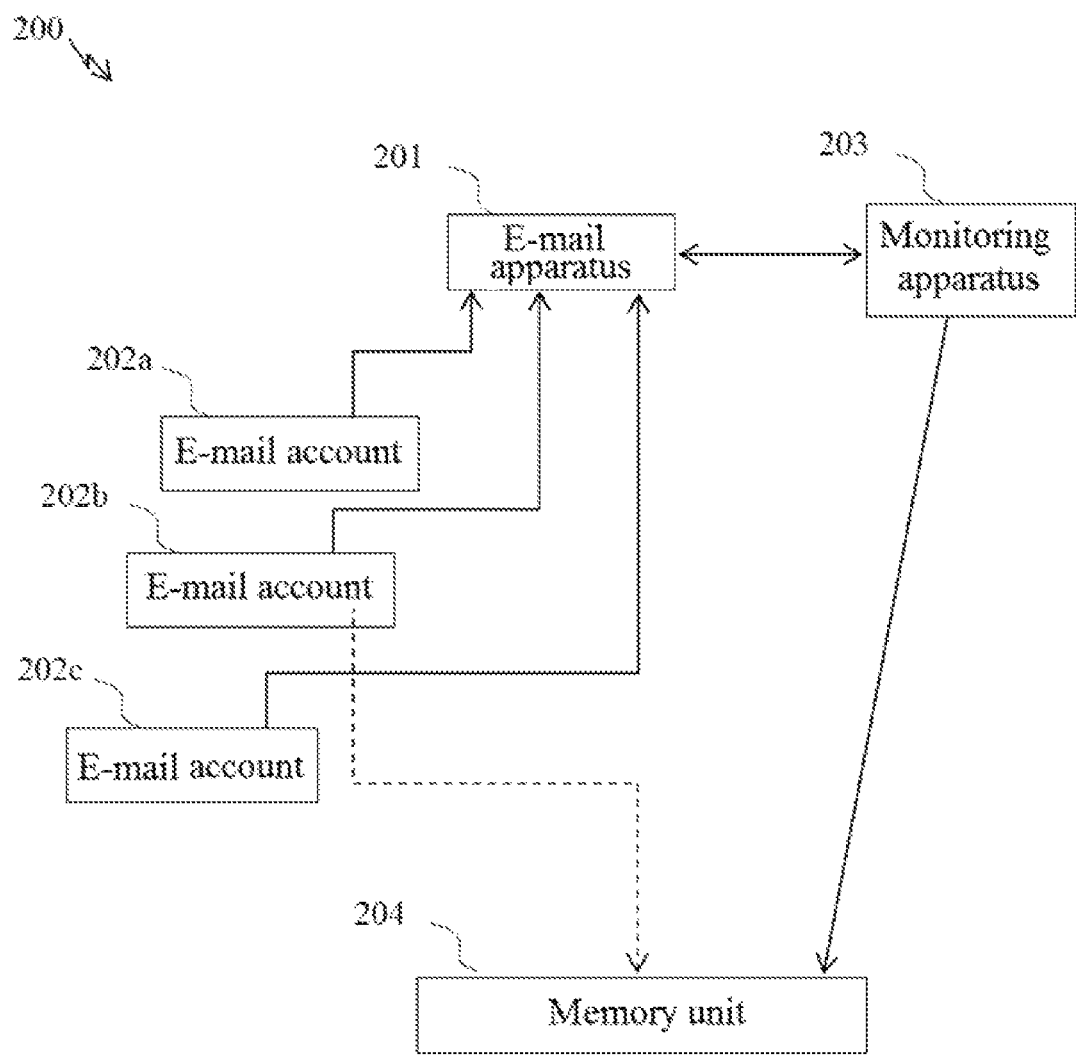
FIG. 2 shows in a non-limiting manner a system notifying on an e-mail presence status via an e-mail client.

Reference is now made to FIG. 2 illustrating in a non-limiting manner a second system 200 for alerting on an e-mail presence status. The second system 200 comprising at least one e-mail client 201 integrating a plurality of e-mail accounts 202a-c, at least one of these e-mail accounts 202a-c, for example, e-mail account 202b is connected to a memory 204. A monitor apparatus 203 is adapted to connect to the e-mail client 201 in order to monitor the activity in one or more of the e-mail accounts 202a-c. Once the monitor detected the above-mentioned activity is uses a predetermined set of parameters in order to set the e-mail presence status of the e-mail client 201. This e-mail status is sent via the monitor apparatus 203 to the memory unit 204.

Figure 3:
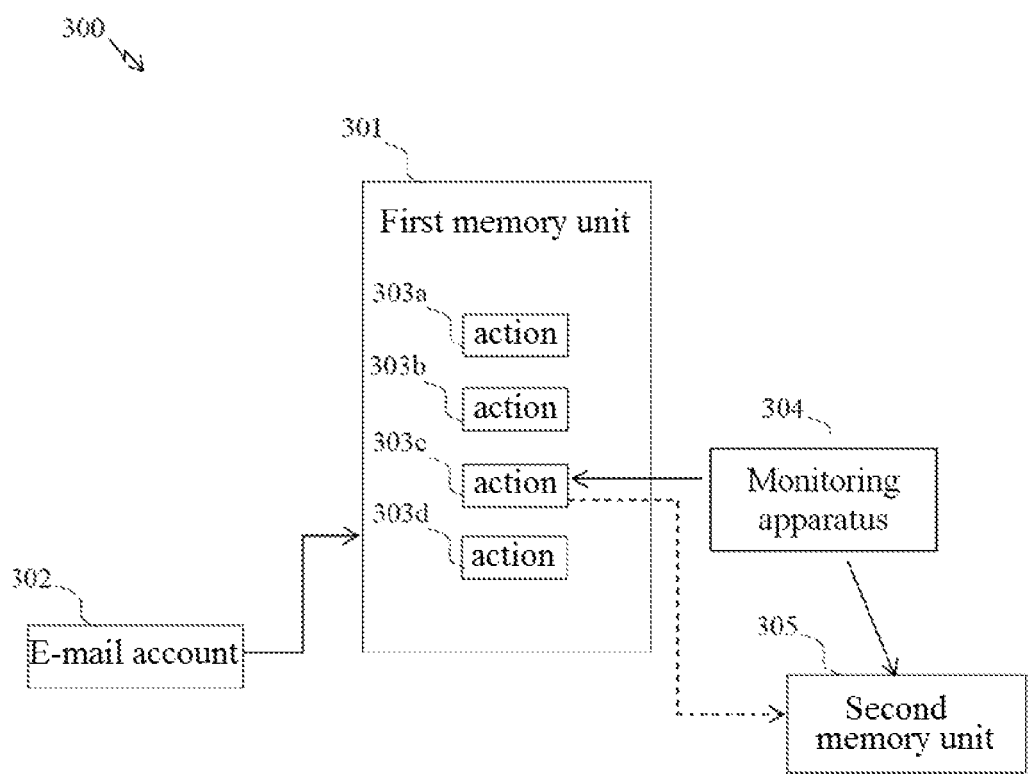
FIG. 3 describes in a non-limiting manner a system for notifying on an e-mail presence status via scan of actions performed on a device associated with the e-mail account.

Reference is now made to FIG. 3, illustrating in a non-limiting manner a third system 300 for detecting an e-mail account 302 e-mail presence status. The e-mail account 302 is communicating with a first memory unit 301 having different actions 303a-d executing on it (for example, by means of an installed software or as part of the operating system installed on it). A monitoring apparatus 304 communicates with at least one of the actions 303a-d, for example, action 303c. The purpose of the monitoring apparatus 304 is to detect certain predetermined parameters related to activity of the specific action 304d. Once the monitoring apparatus 304 has detected these predetermined parameters of activity, it sets the e-mail presence status of the e-mail account 302. At this point, the monitoring apparatus 304 is adapted to notify a second memory unit 305 on the e-mail presence status of e-mail account 302.

Figure 4:
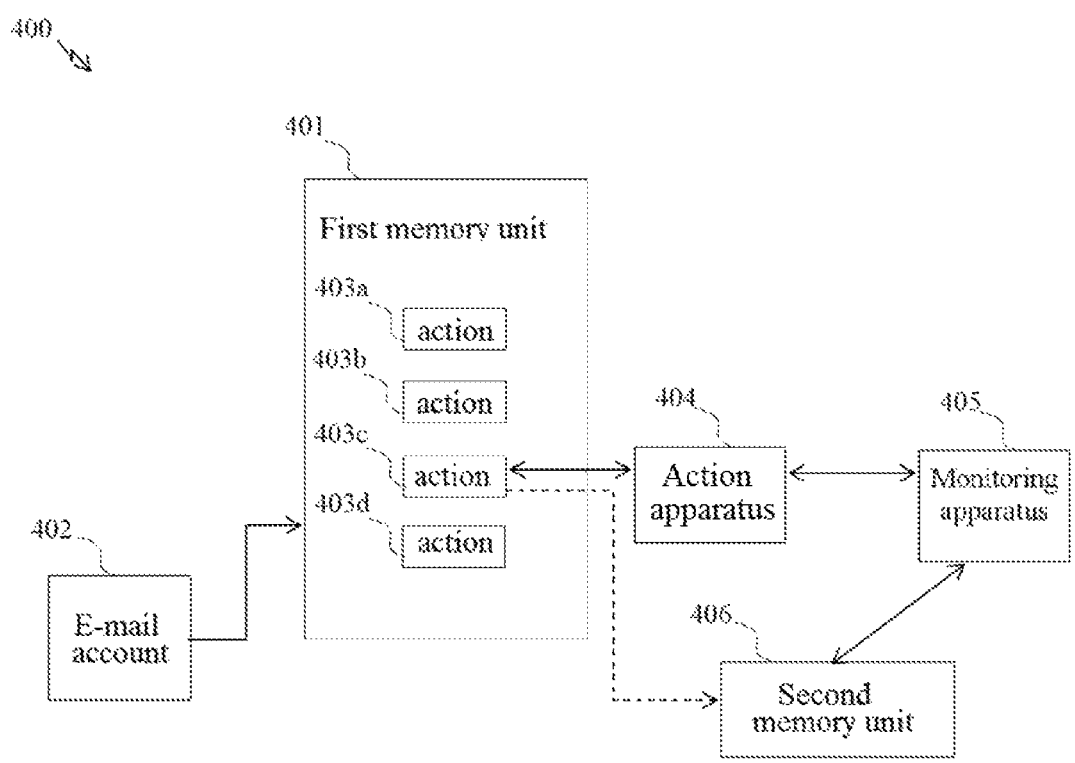
FIG. 4 reveals in a non-limiting manner a system for notifying on an e-mail presence status via scan of an apparatus operating actions performed on a device associated with the e-mail account.

Reference is now made to FIG. 4 illustrating in a non-limiting manner a fourth system 400 for notifying on an e-mail presence status. The fourth system 400 comprises a first memory unit 401 having a plurality of actions 403a-d executing on it (for example, by means of installed software or as part of the operating system installed on it). At least one of these actions 403a-d is connected to an action apparatus 404 operating the action 403c. This action apparatus 404 is monitored by a monitoring apparatus 405 having a set of predetermined parameters for deciding on e-mail presence status of the e-mail account. These predetermined parameters are related to the activity of the monitored action 403c. The e-mail presence status is determined by the monitor server 405 and reported to a second memory unit 406 which communicates with the action 403c.

Figure 5:
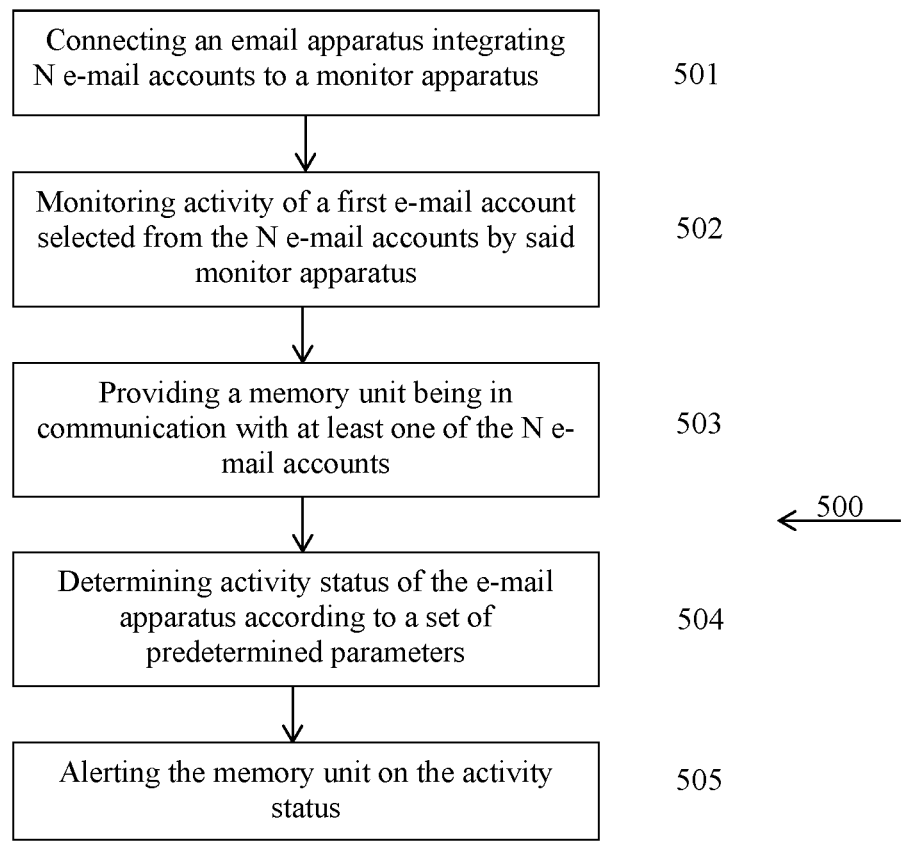
FIG. 5 illustrates in a non-limiting manner a method for notifying on an e-mail presence status via an e-mail apparatus.

Reference is now made to FIG. 5, illustrating in a non-limiting manner a first method 500 for alerting on an e-mail activity status comprising: a. step 501 of connecting via a monitor apparatus, to an e-mail server integrating N e-mail accounts; N is an integer larger than zero; b. step 502 of monitoring activity of a first e-mail account selected from the N e-mail accounts by said monitor apparatus; c. step 503 of providing a memory unit communicating with at least one of the N e-mail accounts. The method additionally comprising steps of: step 504 of determining activity status of the e-mail apparatus according to a set of predetermined parameters; and step 505 of alerting the memory unit on the activity status.

Figure 6:
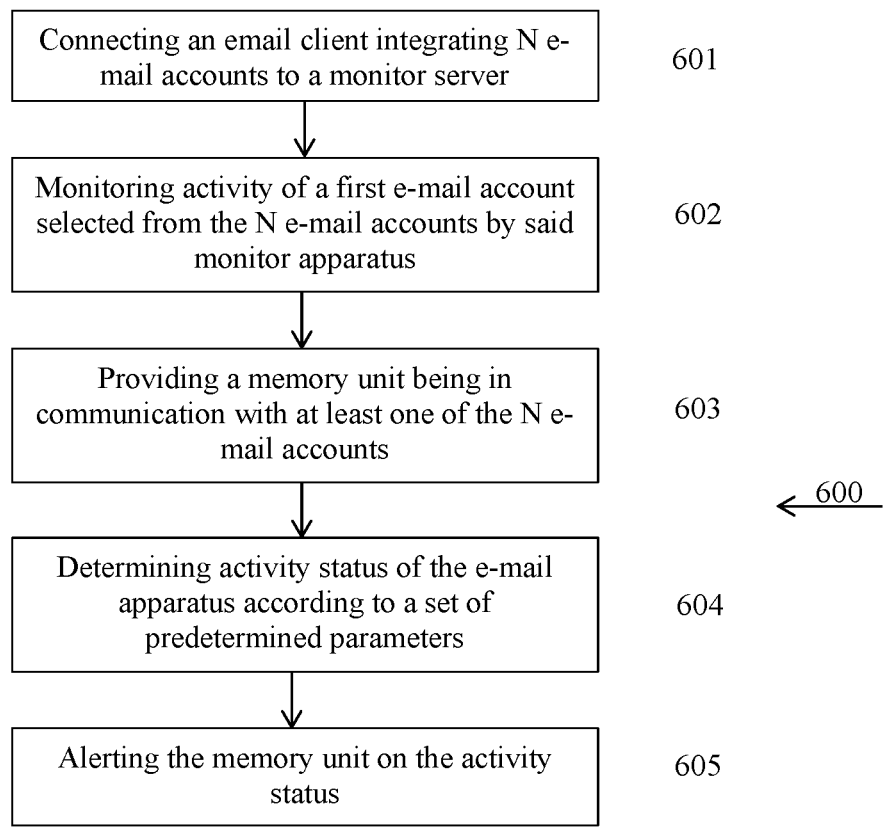
FIG. 6 shows in a non-limiting manner a method for notifying on an e-matt presence status via an e-mail client.

Reference is now made to FIG. 6 illustrating in a non-limiting a second method 600 for alerting on an e-mail activity status comprising: a. step 601 of connecting an e-mail client integrating N e-mail accounts to a monitor apparatus; N is an integer larger than zero; b. step 602 of monitoring the activity of a first e-mail account selected from the N e-mail accounts by the monitor server; c. step 603 of providing a memory unit communicating with at least one of the N e-mail accounts. The method additionally comprises steps of: step 604 of determining activity status of the e-mail client according to a set of predetermined parameters; and step 605 alerting the memory unit on the activity status.

Figure 7:
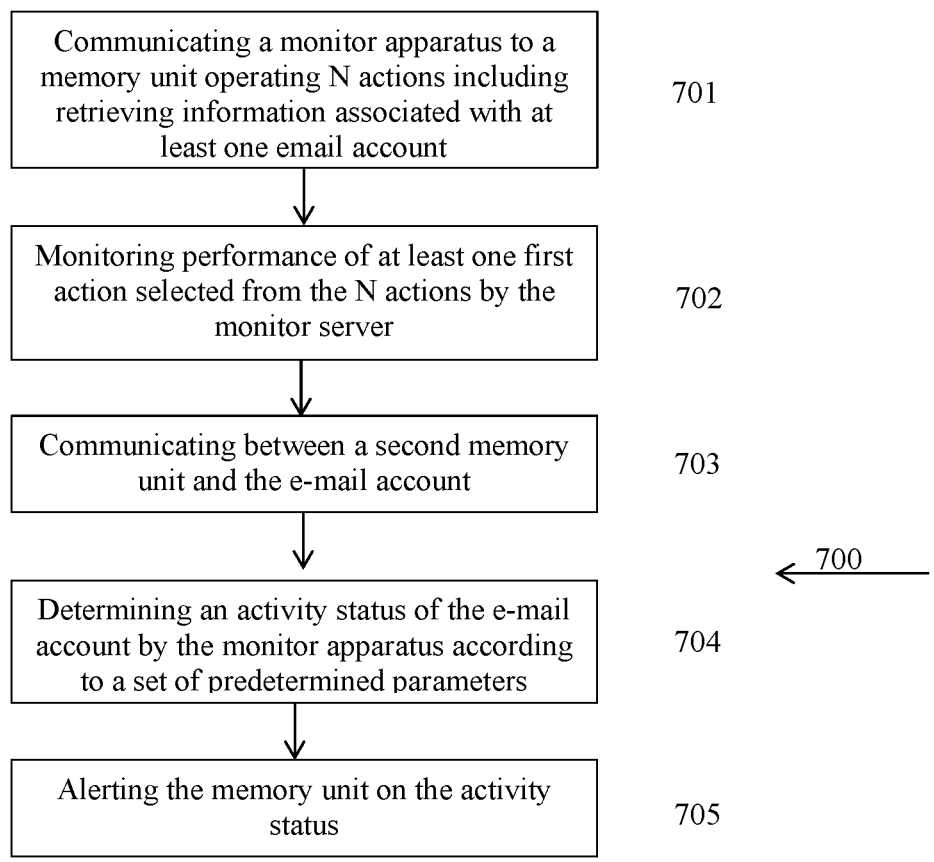
FIG. 7 describes in a non-limiting manner a method for notifying on an e-mail presence status via scan of actions performed on a device associated with the e-mail account.

Reference is now made to FIG. 7 illustrating in a non-limiting a third method 700 for alerting an e-mail activity comprises: a. step 701 of communicating by a monitor server, to a first memory unit operating N actions which includes retrieving information associated with at least one e-mail account; said N is an integer larger than zero; b. step 702 of monitoring performance of at least one first action selected from the N actions by the monitor apparatus; c. step 703 of communicating between a second memory unit and the e-mail account. The method additionally comprising steps of: step 704 of determining activity status of the e-mail account by the monitor apparatus according to a set of predetermined parameters; and step 705 of alerting the second memory unit on the e-mail activity status by the monitor apparatus.

Figure 8:
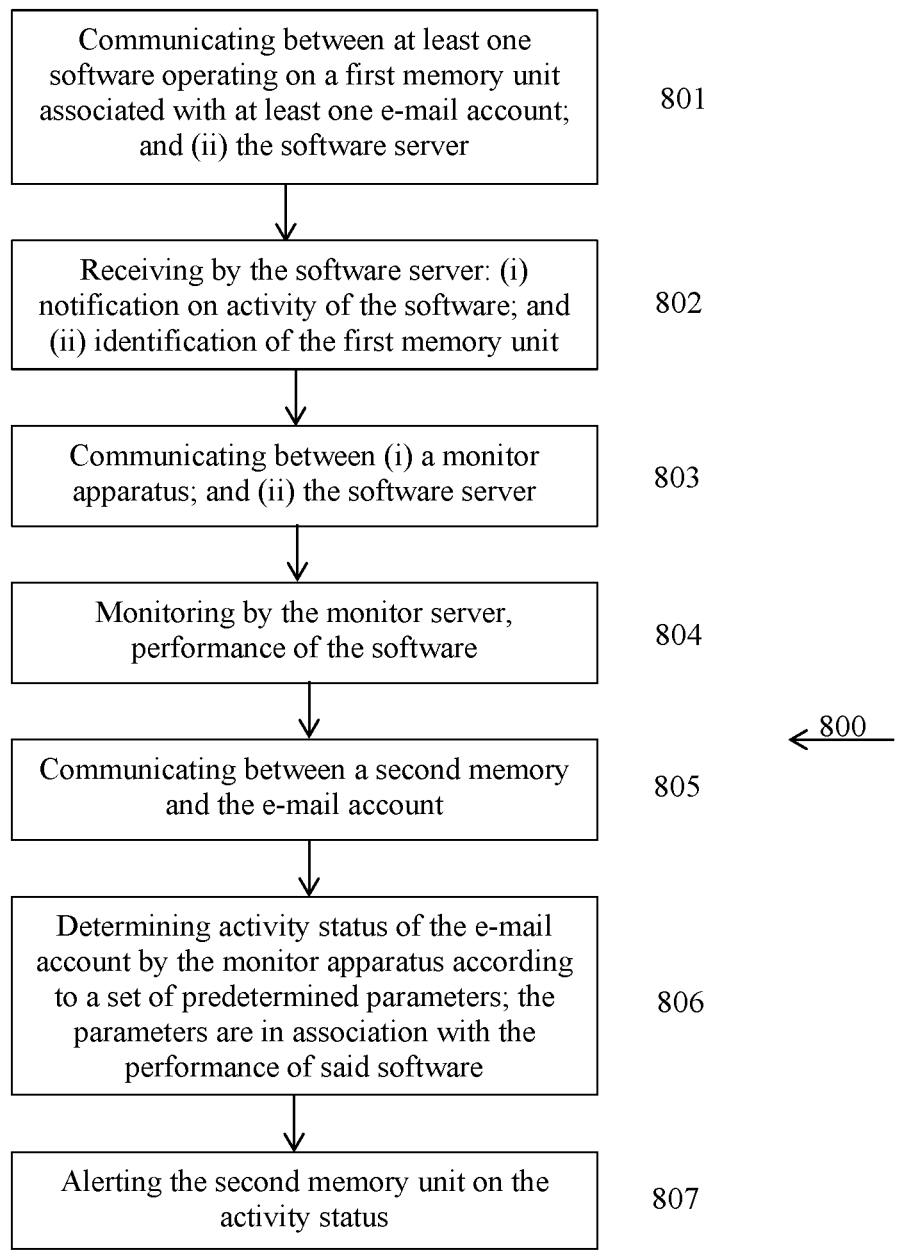
FIG. 8 reveals in a non-limiting manner a method for notifying on an e-mail presence status via scan of an apparatus operating actions performed on a device associated with the e-mail account.

Reference is now made to FIG. 8 illustrating in a non-limiting a fourth method 800 for alerting an email activity status comprising; a. step 801 of communicating between (i) at least one software operating on a first memory unit associated with at least one e-mail account; and (ii) the software server; b. step 802 of receiving by the software server: (i) notification on activity of the software; and (ii) identification of the memory unit; c. step 803 of communicating between (i) a monitor apparatus; and (ii) the software server; d. step 804 of monitoring performance of the software by the monitor apparatus; e. step 805 of communicating between a second memory unit and the e-mail account. The method additionally comprises steps of: step 806 of determining activity status of the e-mail account according to a set of predetermined parameters by the monitor apparatus; the parameters are in association with the performance of said software; and step 807 of alerting the second memory unit on the e-mail activity status by the monitor server.

In one embodiment of the current invention, at least one of the above mentioned first system, second system, third system, fourth system, first method, second method, third method or fourth method is disclosed, wherein the parameters are selected from a group consisting of: number of entries to an e-mail account selected from said N e-mail accounts, type of actions performed in an e-mail account selected from said N e-mail accounts, time length of being active in an e-mail account selected from said N e-mail accounts.

In one embodiment of the current invention, at least one of the above mentioned first system, second system, third system, fourth system, first method, second method, third method or fourth method is disclosed, wherein either one of the memory unit, first memory unit and second memory unit is integrated in a device selected from a group consisting of: mobile device, personal computer, tablet, laptop and any other electronic device comprising communication mean.

In one embodiment of the current invention, at least one of the above mentioned first system, second system, third system, fourth system, first method, second method, third method or fourth method is disclosed, wherein each of at least one e-mail server or e-mail client or e-mail account comprises different set of parameter for identification of the activity status.

In one embodiment of the current invention, at least one of the above mentioned first system, second system, third system, fourth system, first method, second method, third method or fourth method is disclosed, communication between either one of memory unit, first memory unit and second memory unit and with at least one of the N e-mail accounts is done via a third party.

In one embodiment of the current invention, at least one of the above mentioned first system, second system, third system, fourth system, first method, second method, third method or fourth method is disclosed, wherein the parameters are determined by external activity status software.

In one embodiment of the current invention, at least one of the above mentioned first system, second system, third system, fourth system, first method, second method, third method or fourth method is disclosed, wherein either one of server, monitor server or second server stores the monitor data in a data base.

In one embodiment of the current invention, at least one of the above mentioned first system, second system, third system, fourth system, first method, second method, third method or fourth method is disclosed, wherein either one of server, monitor server or second server alerts at least one of said N e-mail accounts on said activity status.

In one embodiment of the current invention, at least one of the above mentioned first system, second system, third system, fourth system, first method, second method, third method or fourth method is disclosed, additionally comprising at least one blocking module integrated in either on In one embodiment of the current invention, at least one of the above mentioned first system, second system, third system, fourth system, first method, second method, third method or fourth method is disclosed, e of e-mail server, e-mail client or e-mail account adapted to block the monitoring.

In one embodiment of the current invention, at least one of the above mentioned first system, second system, third system, fourth system, first method, second method, third method or fourth method is disclosed, wherein said monitoring server additionally analyses activity of said user of said e-mail server.

In some embodiments of the current invention, parameter for identifying a computer readable medium may be a phone number, a serial number, an IMEI number, a MAC address, an IP address, an instant messaging identity, a process number, a process memory address and any other parameter which identifies a computer or a program installed on a computer as well as any combination thereof.

In some embodiments of the current invention as disclosed above, a user of an e-mail account might allow to share any of the predetermined parameters, a derivative or a combination thereof regarding his e-mail presence status with different watchers, employing a privacy mechanism where certain watchers might get the any of: the entire, partial, derivative or non- of the e-mail presence statuses. Selectively, different watchers can get different portions of the e-mail presence status.

For example, a first e-mail user gets an e-mail from a second e-mail user. The first user allows to share information about an e-mail being forwarded with the second e-mail user. The second e-mail user gets an e-mail presence status in the form of an alert, when the e-mail is being forwarded to a third e-mail user by the first e-mail user. The e-mail presence status may also include the time, the name and the address of the third e-mail user.

Its yet another example a first e-mail user gets an e-mail from a fourth e-mail user and forwards it to a fifth e-mail user. The first e-mail user does not allow to share the information about who is the fifth e-mail user, but only about the fact that the e-mail itself was indeed forwarded. The fourth e-mail user will get an alert that the e-mail was forwarded by the first e-mail user without revealing the name and the address of the fifth e-mail user.

In some embodiments of the current invention as disclosed above, data regarding activity of either one of the e-mail account, e-mail server, first memory unit, any action performed on the first memory unit, is stored for later analysis. This analysis may differ from the "predetermined parameters" regarding the e-mail presence status determination, in the sense that analysis may produce data on the user behavior. For example, it may predict user behavior and change the e-mail presence status accordingly. Example of such user behavior e-mail presence status may be: "user is offline but will probably be available in two hours", "user is online, but likely to answer e-mails in the morning", "user is online during working hours, he will probably not respond during the weekend" etc.

Figure 9:
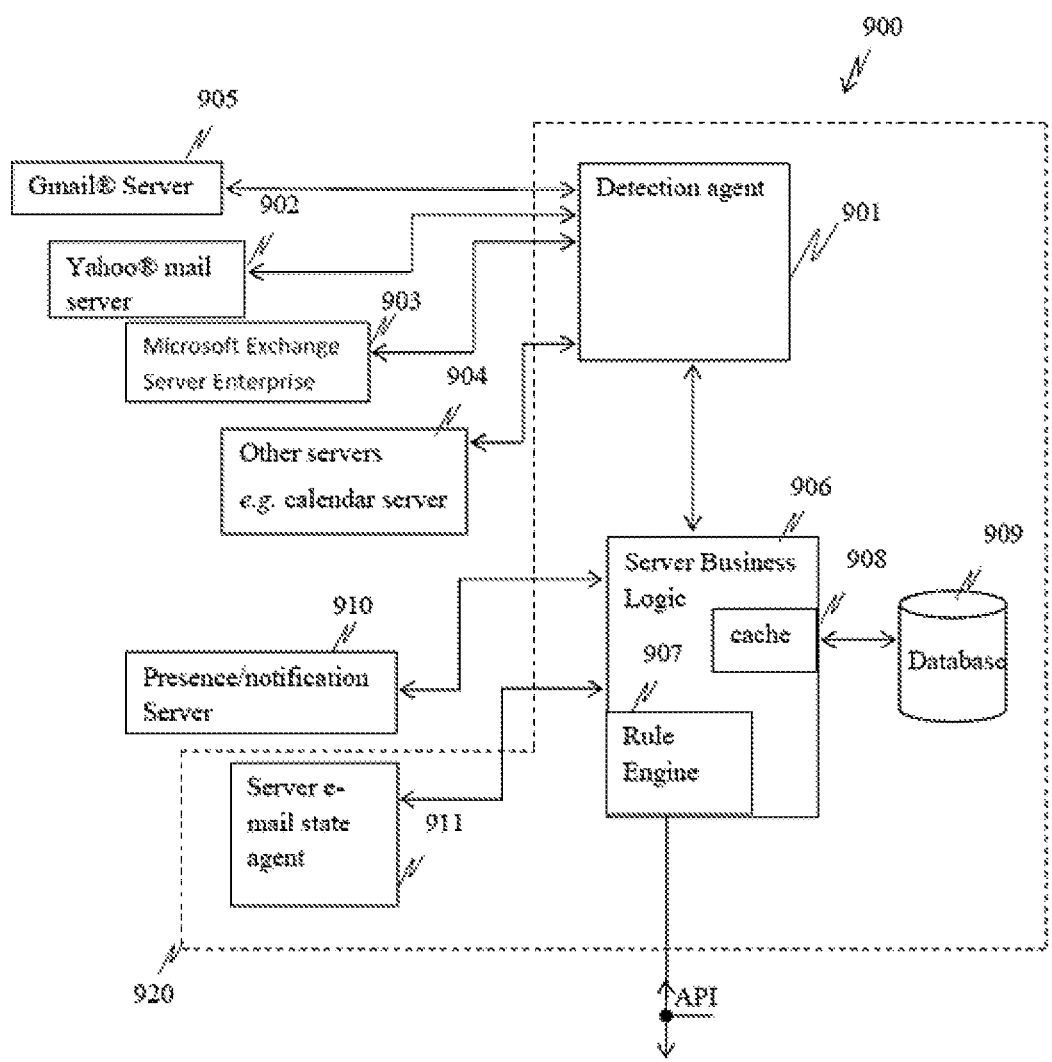
FIG. 9 illustrates a detailed structure of a system for detecting and notifying e-mail presence status.

Reference is now made to FIG. 9 illustrating in a non-limiting manner, a system for deciding on an e-mail status. A detection agent 901 is communicating with different servers, such as: Gmail® 905, Yahoo mail Server® 902, Microsoft Exchange Server Enterprise 903, and other servers 904. The detection agent 901 is connected to a server business logic module 906 having a rule engine 907 for operating server rules on data received from the detection agent 901. Rule engine 907 exposes an API to external modules for setting server rules. In addition, the server business logic module 906 has a cache 908 for storing data on top of a database 909.

The server business logic module 906 uses the server rules in order to determine and decide on the e-mail presence status of one the e-mail accounts or the user using them. The presence/notification server 910 is either a presence server known in the arts, implementing a subscribe/publish model, or a plain notification server that notifies a user of an e-mail presence status change. The notification can take place as either notify or fetch step. The recipient of the e-mail presence status is called Watcher User Agent (WUA) for simplicity, which is either a watcher subscribed to a presentity of one or more e-mail presence statuses in the case of a presence server or merely an authorized recipient in the case of plain notification server. In addition, there is an e-mail state agent server 911, extracting (by either notify or fetch step) the e-mail predetermined parameters. Reference is made again to FIG. 9 where the elements of detection agent 901, server business logic 906, database 909, and server e-mail state agent 911, are all integrated into a unit of a monitor server 920.

Figure 10:
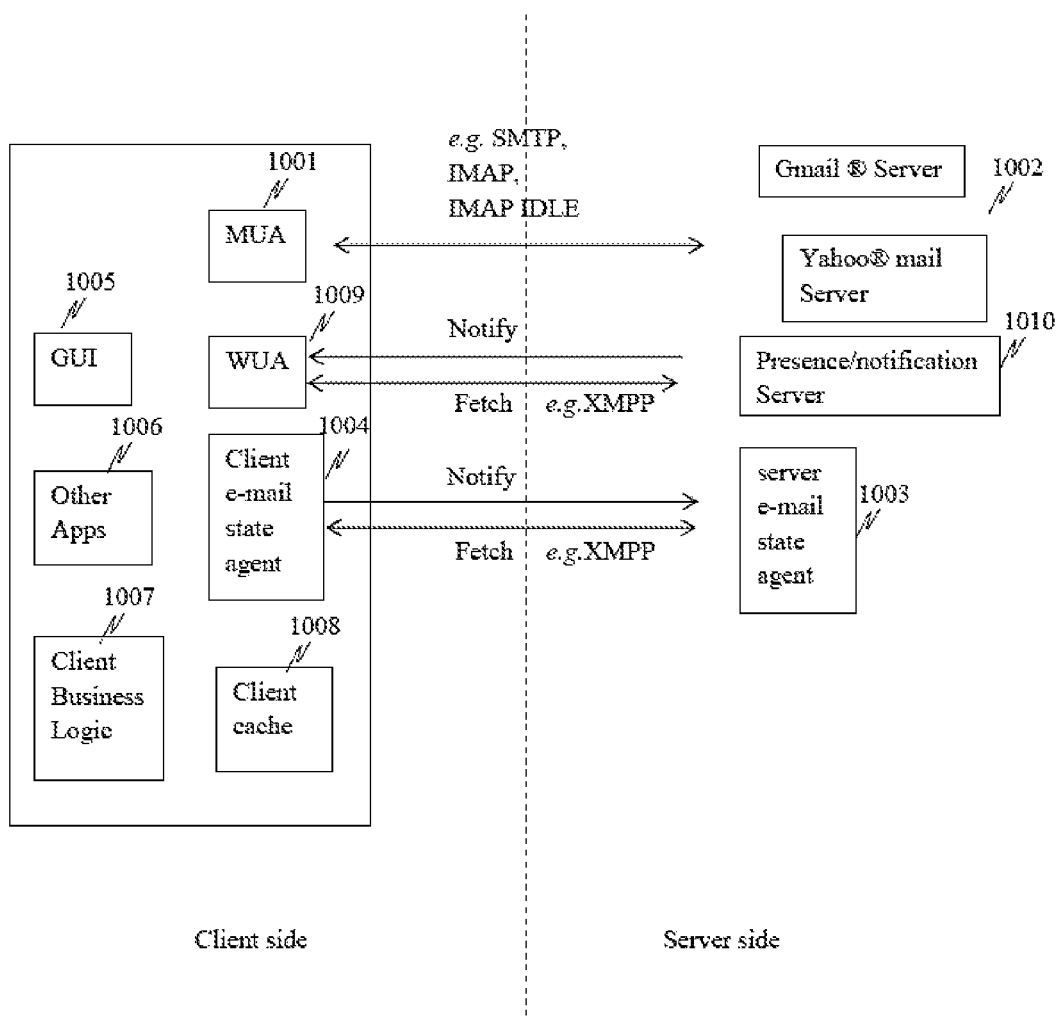
FIG. 10 describes a schematic view of a system for notification of an e-mail presence status divided into "client side" and "server side".

Reference is now made to FIG. 10 illustrating in a no limiting manner, the client side and the server side of the above-mentioned system. The client is having different modules, such as a GUI, a client e-mail state agent, a cache etc. It also has an MUA 1001 communicating via one or more e-mail protocols with e-mail servers 1002. The servers (for example the server e-mail state agent 1003 is either receiving notification or fetching vita a communication protocol (e.g. XMPP) with the client e-mail state agent 1004 operating on the client side. client e-mail state agent 1004 extracts predetermined parameters from MUA 1001 and from other apps 1006 (e.g. detecting information from iOS Notification Center on the Apple iPhone device) and in some cases analyses the information at client business logic module 1007 before transferring it to sexy mail state agent 1003.

Reference in now made again to FIG. 10, illustrating in a non-limiting manner, the communication flow between the client side and the server side. The presence or notification server 1010 delivers data to the WUA 1009 in the client side in two steps fetch and notify (i.e. through an API). The same goes to the client e-mail state agent 1004 communicating with server e-mail state agent 1003 by notify and fetch steps. Other modules installed on the client side may be GUI 1005. Data is stored in the client cache 1008.

In some embodiments of the current invention as disclosed above, actions performed on the e-mail account or one or more of the e-mails contained in the e-mail account are updated in the predetermined parameters.

In some embodiments of the current invention as disclosed above, the rule engine being part of server business logic module 906 takes into account generic server rules, server rules on a user basis, server rules on an e-mail account basis as well as, among others, server rules on per device, sender, recipient, subject, keywords, language, time and location. The rule engine applies the server rules on the predetermined parameters. The rule engine module 907 implements privacy mechanism where certain watchers such as WUA 1009 are allowed to subscribe to portions of e-mail presence statuses of a specific e-mail account. The server rules determine on a per e-mail account, who is allowed to get which e-mail presence status and whether in full or in part. Server business logic module 906 takes into account multiple predetermined parameters and outputs of its rule engine module 907 to analyze the predetermined parameters and create multiple e-mail presence statuses for each of the e-mail accounts at any given time or as triggered by the arrival of one or more new values of predetermined parameters. The e-mail presence statues are then sent to the presence/notification server module 910 which distributes the information to different WUAs.

In some embodiments of the current invention as disclosed, above, e-mail account can forward e-mails to another account or program responsive to receiving automatically or temporarily an e-mail or its subset (e.g. notification of subject only). When the forwarded instance of the e-mail or its subset is being accessed or any other action is performed on it by the user, depends on its business logic and rule engine, the system might treat an access or an action performed on a forwarded instance of the e-mail or its subset, similarly to accessing or performing an action of the original copy of the e-mail and update the predetermined parameters accordingly and subsequently the e-mail presence status.

In some embodiments of the current invention as disclosed above, e-mail account rules are a set of rules determined by the account user, account administrator, spam filter or any other 3.sup.rd party or application. The e-mail account rules perform actions on e-mail account whether regularly, from time to time, or triggered as a response to an action performed on the e-mail account. E-mail account rules may reside on the e-mail server, the e-mail client, or on any proxy in between. The system is capable of taking these e-mail account rules into account within the business logic and rules engine modules while ignoring an action which is triggered by an automatic e-mail account rule or an administrator. Thus, the related predetermined parameters would be marked as actions triggered by automatic e-mail account rules which may not affect the e-mail presence status of the related e-mail account.

In some embodiments of the current invention as disclosed above, multiple e-mail clients on same device and/or on multiple devices are configured with the same e-mail account. Actions performed on the e-mail account through one or more of the e-mails clients are recorded within the predetermined parameters, and the e-mail presence status might be affected in a segmented way advising the e-mail account status on a per e-mail client and/or device basis.

In some embodiments of the current invention as disclosed above, an e-mail account user or a 3.sup.rd party might choose to run in an invisible mode which occurs either at the level of blocking the monitoring server from accessing the e-mail account and/or the level of the business logic module which prevents the e-mail presence status from being shared with watchers/recipients. A user might elect to completely block the e-mail presence status from recipients or selectivity share the e-mail presence status with some recipients employing a privacy mechanism within the Business logic. Similarly, users may elect to have a manual e-mail presence status always online, invisible mode), a time-dependent e-mail presence status (online between 8 am to 5 pm, offline otherwise) or a location aware e-mail presence status (online at the office, offline when home).

Example 1

In one example of the current invention, a first user would like to send to a second user an e-mail message. A monitoring server is communicating with the e-mail server and monitors the second user activity in his e-mail account. In case the second user sent three messages in the past half an hour, the monitoring server decides that the second user e-mail presence status is: "active". A notification of this status is sent to the first user's e-mail account.

Example 2

In another example of the current invention, a user is provided with a first mobile device, this first mobile device is communicating with an e-mail server, and has other applications installed on it. One of these applications is an instant messaging application communicating with a second mobile device.

A monitoring server is communicating with both mobile devices. The monitoring server detects the activity of the instant messaging application on the first mobile device directly or through an e-mail state agent client, and in case the application communicated with three different users in the last 20 minutes, it sets the e-mail presence status to: "active", this e-mail presence status is then sent to the e-mail client on the second mobile device.

Example 3

In another example of the current invention a tablet is provided with an e-mail program integrating 3 e-mail accounts. In addition, an instant messaging (IM) application is installed on a tablet, the instant messaging program is operated via a server. Any message sent or received by the IM is going through the server. A monitoring server is connected to the IM server and counts the data transferred to the tablet by the IM application, once the data size exceeds X byte, the monitoring server sets the e-mail presence status of all 3 e-mail accounts to be "online".

A user having a mobile device is communicating with the owner of the tablet through the IM application (and as a result is having an identification parameter of the tablet owner), the e-mail presence status is sent to the user of the mobile device through the IM application.

Example 4

In another example of e current invention, an e-mail server is in communication with a monitoring server. However, the server has a program installed on it, which allows a client of an e-mail account to disable access of the monitoring server to his account. Thereby, preventing the ability to determine the e-mail presence status.

Example 5

In another example of the current invention, GOGGLE Glass® are connected to FACEBOOK® and to GMAIL® e-mail account. An external server is connected to these glasses through a WiFi connection. A FACEBOOK® notification appears to the user on the glasses display. The server detects this notification, and sets the e-mail account status to be "operating on GOGGLE Glass®".

Example 6

An e-mail account has a set e-mail rule to automatically forward all received e-mails to a second e-mail account. The user logs into the second e-mail account which is being monitored by the detection agent. The detection agent detects the user has read the e-mails arrived from the first e-mail account recently. This information is sent to the business logic and its rule engine, which in turn decide that the user is currently "online" at both e-mail accounts.

Example 7

An iOS mobile device has an e-mail application installed on it. The e-mail application is connected to an e-mail server using IMAP and SMTP protocols. In addition, the e-mail server is connected to the Apple Push Notification service (APNs). When an e-mail is received by the e-mail server it pushes a notification to the iOS mobile device through the APNs. When a user opens up the notification (which is usually a subset of the e-mail) the predefined parameters will be updated and the e-mail status will change to "online" or "able to read notifications"

Example 8

A mobile device user opens his e-mail via an e-mail application installed on his device. He sends an e-mail to a first friend, the data relating to this activity is sent to the monitor server. The monitor server, then sends a notification stating "e-mail sent t minutes ago" to a second friend The t indicates the time passed from sending the e-mail and is updated continuously.

Example 9

A mobile device user reads and deletes an e-mail via an e-mail application installed on his device. The e-mail was sent from a first friend and the data relating to these actions is sent to the monitor server. The monitor server, then sends a notification stating "your e-mail was read and deleted" to the first friend.

Example 10

A mobile device accepts a meeting through his calendar application installed on his device. The action is detected by the client e-mail state agent which in turn is sent to the monitor server. The monitor server, then sends a notification stating "active for email and calendar" to the work-related watchers subscribed on his e-mail presence statuses, other watchers will not get these notification as a server rule was set in advance to allow only work-related watchers to receive calendar extracted e-mail presence status.

The invention claimed is:

1. A system for notifying different users about an availability status of a user, comprising:
   at least one processor that executes a code for:
   receiving a plurality of rules predetermined by a user associated with an email account, each of said plurality of rules defines for another one of a plurality of other different users a specific set of parameters allowed to be presented on a client device of a respective other user, wherein each specific set of parameters is a subset of a plurality of parameters of an availability status of said user associated with said email account;
   monitoring an e-mail server to gather activity data of the user associated with said e-mail account;
   analyzing the activity data to determine a current availability status of the user, the current availability status is indicative of ability and willingness of the user to act at a given time as a potential communication partner; and
   sending a plurality of messages for presentation on a plurality of graphical user interfaces (GUIs) executed by a plurality of client devices of said plurality of other different users, each of said plurality of messages is designed to induce a presentation of a respective specific set of parameters of said current availability status of said user on a GUI of a client device of a respective one of said plurality of other different users, according to said plurality of rules.

2. The system of claim 1, wherein the message is sent using a message sent through an instant messaging (IM) application.

3. The system of claim 1, wherein the message is sent to a plurality of email accounts of the plurality of different users.

4. The system of claim 1, further comprising identifying a location of the user wherein the message comprises an indication of the location to induce a presentation a location aware availability status that is indicative of the location on the plurality of GUIs.

5. The system of claim 1, wherein the message with the current availability status is forwarded through an Application Program Interface (API).

6. The system of claim 1, wherein the message is sent an Extensible Messaging and Presence Protocol (XMPP) communication protocol to a plurality of client agents each executed on the plurality of client devices.

7. The system of claim 1, wherein the monitoring is performed by extracting parameters from a communication held with the at least one e-mail server according to at least one of Internet Message Access Protocol (IMAP) and Simple Mail Transport Protocol (SMTP) protocol.

8. The system of claim 1, further comprising selecting the plurality of client devices according to predetermined parameters set by a rule applied by a rule engine.

9. The system of claim 1, wherein the availability status is indicative of last activity timing.

10. A method for notifying different users about an availability status of a user, comprising:
    using at least one processor executing a code for:
    receiving a plurality of rules predetermined by a user associated with an email account, each of said plurality of rules defines for another one of a plurality of other different users a specific set of parameters allowed to be presented on a client device of a respective other user, wherein each specific set of parameters is a subset of a plurality of parameters of an availability status of said user associated with said email account;
    monitoring at least one e-mail server to gather activity data of the user associated with said e-mail account;
    analyzing the activity data to determine a current availability status of the user, the current availability status is indicative of ability and willingness of the user to act at a given time as a potential communication partner; and
    sending a plurality of messages for presentation on a plurality of graphical user interfaces (GUIs) executed by a plurality of client devices of said plurality of other different users, each of said plurality of messages is designed to induce a presentation of a respective specific set of parameters of said current availability status of said user on a GUI of a client device of a respective one of said plurality of other different users, according to said plurality of rules.

* * * * *